US005513939A

United States Patent [19]
Martin et al.

[11] Patent Number: 5,513,939
[45] Date of Patent: May 7, 1996

[54] LIFTING DEVICE FOR PROPANE TANK

[75] Inventors: Wesley D. Martin, Jackson, Wyo.;
Lynn A. Adams, Logan, Utah

[73] Assignee: L.P. Tank Troll, Inc., Jackson, Wyo.

[21] Appl. No.: 300,469

[22] Filed: Sep. 2, 1994

[51] Int. Cl.[6] ........................................ B62B 1/22
[52] U.S. Cl. .................... 414/447; 414/460; 414/490;
 280/47.24; 280/47.315
[58] Field of Search ........................ 414/444–449,
 414/457, 459–461, 490; 280/47.131, 47.17,
 47.19, 47.24, 47.315

[56] References Cited

U.S. PATENT DOCUMENTS

| | | | |
|---|---|---|---|
| 2,019,256 | 10/1935 | Dutton | 414/447 |
| 2,498,014 | 2/1950 | Spencer, Jr. et al. | 414/447 |
| 2,576,048 | 11/1951 | Schum | 414/447 |
| 2,772,010 | 11/1956 | Buehring | 414/460 |
| 2,870,928 | 1/1959 | Haggard et al. | 414/447 |
| 2,893,580 | 7/1959 | Fischer | 414/460 |
| 3,667,728 | 6/1972 | Garelick | 414/447 X |
| 4,023,694 | 5/1977 | Hawkins | 414/461 X |
| 4,072,241 | 2/1978 | Parker et al. | 414/459 X |
| 4,981,412 | 1/1991 | Hawkins | 280/47.315 X |
| 5,257,892 | 11/1993 | Branch | 280/47.315 X |

Primary Examiner—Michael S. Huppert
Assistant Examiner—James W. Keenan
Attorney, Agent, or Firm—Hopkins, Roden, Crockett, Hansen & Hoopes

[57] ABSTRACT

This invention discloses a two-wheeled device that can roll over and straddle three sizes of tanks, extend the adjustable feet to a lift position, raise the back end of the tank, connect a chain and hook to the front end of the tank, lift both front and back tank legs off the ground, and roll the tank over the ground or floor. The handle length is adjustable to accommodate three different tank lengths and the chain and hook can also adjust horizontally to accommodate these three lengths. The feet are also retractable to permit rolling the device past the two front legs on the tank.

7 Claims, 2 Drawing Sheets

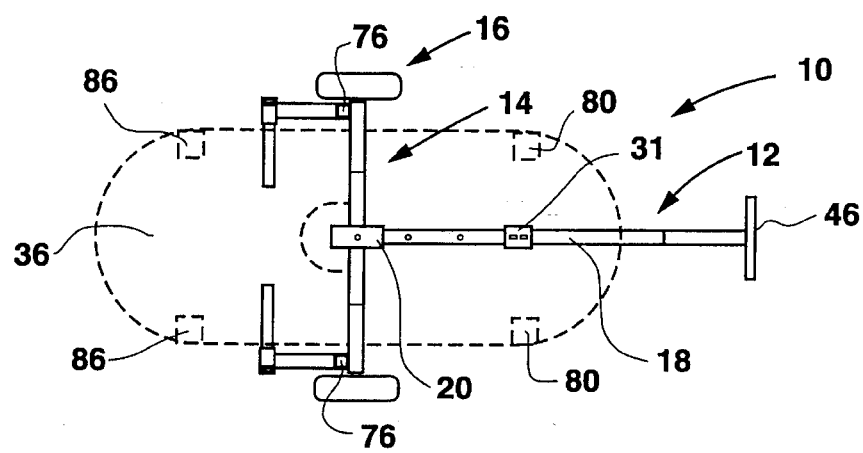
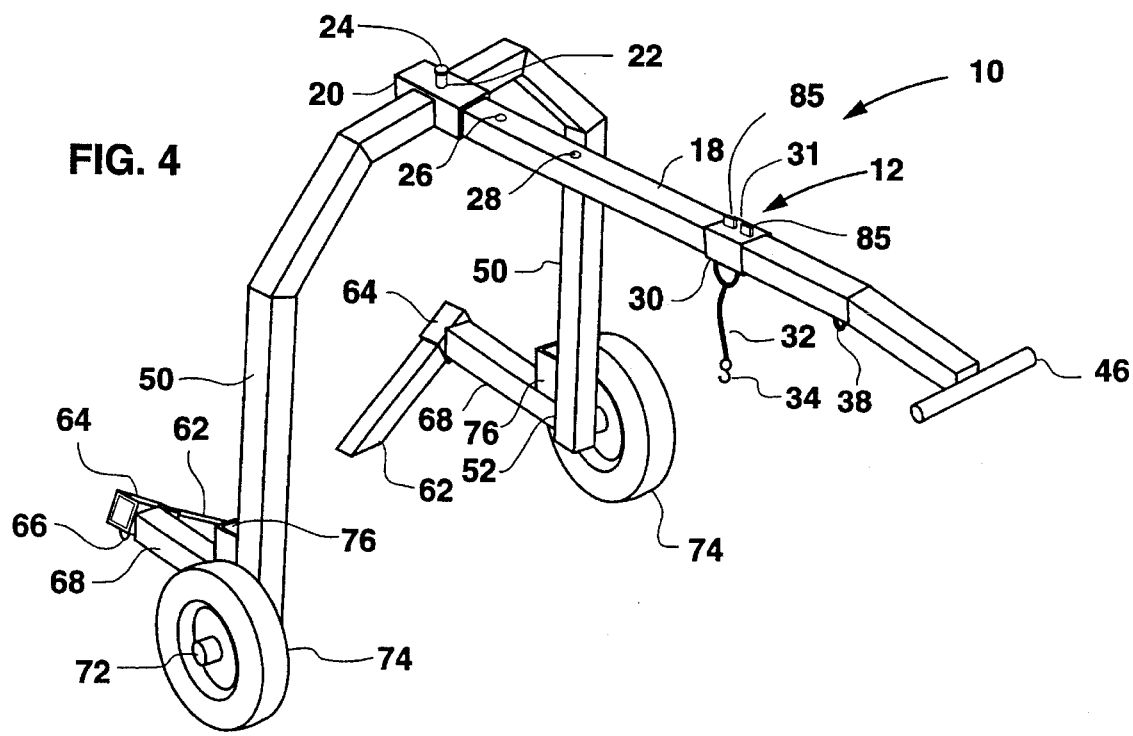

LIFTING DEVICE FOR PROPANE TANK

BACKGROUND OF THE INVENTION

1. Field Of The Invention

This invention relates to a lifting device for multiple sizes of large, empty, liquid propane (LP) gas tanks by a single person who can then roll the tanks to a new location.

2. Background Of The Invention

In handling of the larger propane tanks by a single person, it would be extremely desirable to have a simple no-power-required lift dolly that can move an LP gas tank around in a dealer's yard or facility.

Typically, lifts available for the 120-, 250-, and 500-gallon horizontal cylinder tanks require an electric hydraulic or hand-winch hoist. Although these can be operated by a single operator, they are more expensive, would require more maintenance, and would not lift as rapidly as the present invention.

Although there are many hand-dollies or hand-trucks for moving vertical cylindrical gas bottles or tanks, a simple, one-man lift device for horizontal tanks is not available. The dimensions on these tanks are given in Table 1 below.

| Capacity | Length | Diameter | Tank Weight |
| --- | --- | --- | --- |
| 120 gal. | 3' | 24" | 270 lbs. |
| 250 gal. | 5' | 30" | 730 lbs. |
| 500 gal. | 8' | 38" | 1250 lbs. |

SUMMARY OF THE INVENTION

This invention discloses a two-wheeled device that can roll over and straddle three sizes of tanks, install the removable feet to a lift position, raise the back end of the tank, connect a chain to the front end of the tank, lift both front and back tank legs off the ground, and roll the tank over the ground or floor. The handle length is adjustable to accommodate three different tank lengths and the chain also adjusts horizontally to accommodate these three lengths. The feet are also removable to permit rolling the device past the two front legs on the tank.

The invention generally stated is a device for lifting multiple sizes of tanks comprising:

- a handle assembly having an adjustable length for different length tanks;
- a horizontally adjustable chain and hook attached to the handle assembly;
- a U-shaped arch assembly adjustably attaching to the handle assembly;
- a pair of foot-and-wheel assemblies affixed to a bottom portion of the arch assembly, said foot and wheel assemblies further comprising:
    - a leg affixed to the bottom portion of the arch assembly and having an affixed foot sleeve and a wheel;
    - a foot slidably retained within the foot sleeve, said foot having an extended position and a stored position;

and wherein the lifting device can be rolled over the tank with the feet in the stored position and then said feet inserted in the extended position for lifting the tank and attaching the chain to the tank for transport.

Other objects, advantages, and capabilities of the present invention will become more apparent as the description proceeds.

BRIEF DESCRIPTION OF THE DRAWINGS

FIG. 3 is a plan view of the lifting device; and

FIG. 4 is a front perspective view of the lifting device.

DETAILED DESCRIPTION OF THE PREFERRED EMBODIMENTS

Figure 1:
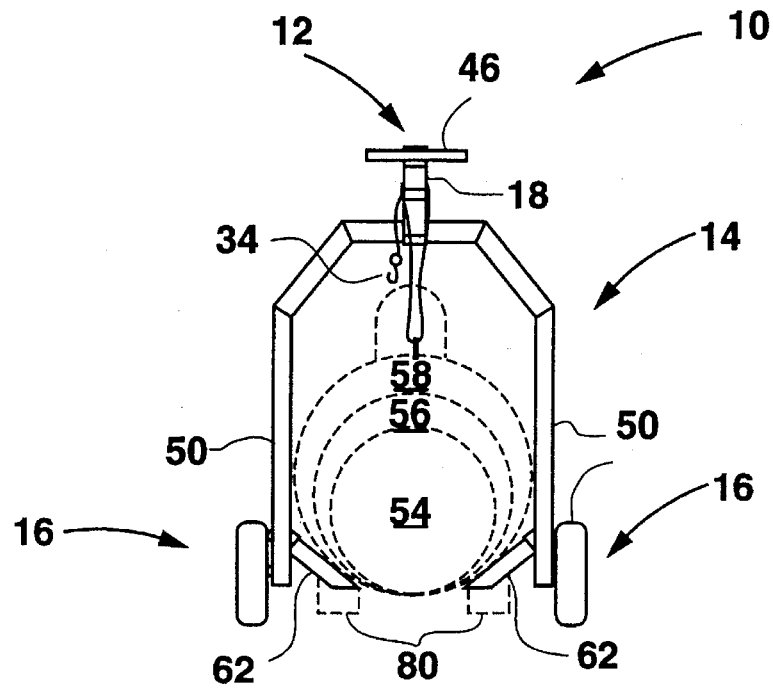
FIG. 1 is a front elevation of the present propane tank lifting device.

The present invention is a heavy-duty lifting device for lifting and transporting liquid propane (LP) tanks by a single person without the use of hoists, as seen in FIGS. 1–4. Lifting device 10 consists of three major assemblies: a handle assembly 12; a U-shaped arch assembly 14 that can straddle 120-, 250-, and 500-gallon LP gas tanks; and a wheel-and-foot assembly 16.

The handle assembly 12 consists of an arm 18, slidably attached within an arch sleeve 20. The arm has three drilled apertures on 10" centers, the first pin aperture 22 is pinned to arch sleeve 20 using toggle pin 24 when lifting 500 lb. tanks. The second and third pin apertures 26 and 28 being pinned at arch sleeve 20 when lifting 250 lb. and 120 lbs. tanks, respectively. Near the center of beam 18 is a chain loop 30 on a horizontally slidable sleeve 31 with an attached chain 32 and S-hook 34 for attaching the chain to a tank lug 36 when transporting tanks.

The arch assembly 14 further consists of a pair of U-shaped arch arms 50 having top portions welded to the opposite sides of arch sleeve 20. A bottom portion of the arms 50 is welded to the wheel-and-foot assembly as at 52. In FIG. 1, one can see how the arch assembly can straddle phantom diameters 54, 56, and 58 of the 120-, 250-, and 500-gallon tanks, respectively.

The wheel-and-foot assembly 16 has adjustable feet 62 that are slidably affixed and retained within foot sleeves 64 by a nub 66 welded to the bottom of the foot. The foot sleeves 64 are welded to a first end of a pair of legs 68. The second leg end is welded to the arch arms at 52. The legs 68 also have spindles 72 which rotatably support wheels 74. In the extended position, the feet 62 are fully extended so as to support both the smaller or larger diameter tanks 54, 56, or 58. When moving the device over the tanks 54, 56, or 58, the feet 62 would be placed in the storage gusset 76 (FIG. 4). The feet 62 need to be retracted and stored in the gusset 76 in order to roll the lifting device 10 past the tank front legs 80.

Figure 2:
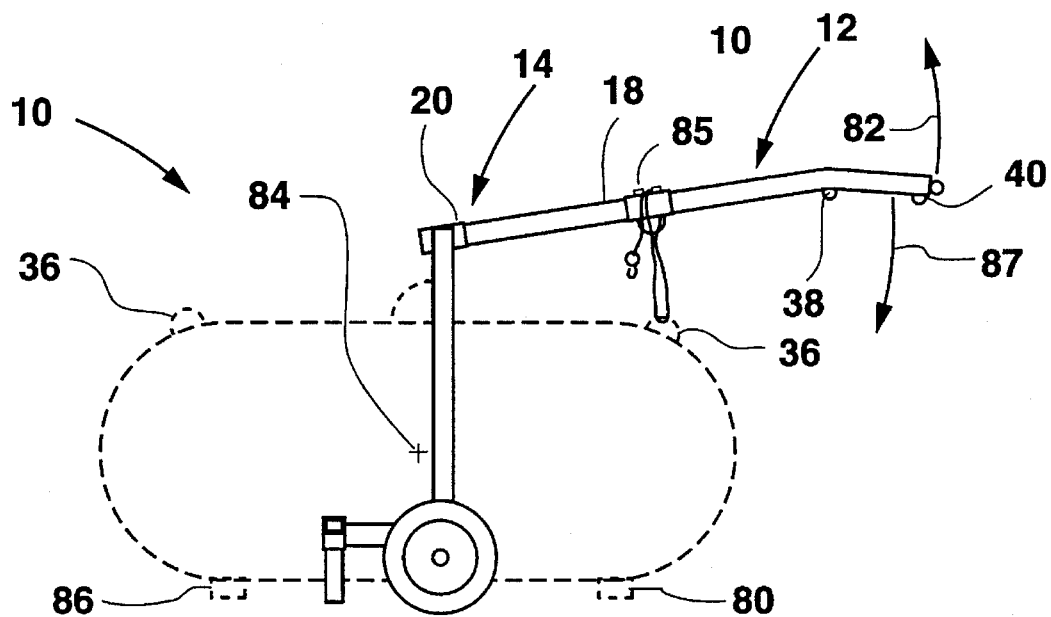
FIG. 2 is a side elevation of the lifting device.

Operation of the tank will be described by referring to FIGS. 2 and 4. Feet 62 must first be removed from the foot sleeve 64 and placed in the storage gusset 76 so the legs can pass by the front tank legs 80. The handle assembly 12 is pinned at the aperture 22, 26, or 28 depending on which size tank is being moved, and then the handle is raised as at arrow 82. The lifting device is then pushed so as to move the feet 62 beyond the center of gravity 84 of the tank 58. The feet 62 are then placed in the fully extended position. The chain hook 34 can be passed through the tank lug 36 after the handle is pulled back down as shown by arrow 87 in FIG. 2. After the chain 32 is restrained by chain lugs 85, the handle is raised slightly so that both the front legs 80 and back legs 86 are clear of the ground and the tank can then be rolled to new position. Because of the 5 to 1 ratio of handle length to leg length, the force necessary to raise even the large tank is less than 100 lbs.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. A device for lifting multiple sizes of tanks comprising:
   a. a handle assembly having a horizontally adjustable length to accommodate different lengths of tanks;
   b. a horizontally adjustable assembly comprising a sleeve, chain and hook slidably attached to the handle assembly;
   c. a U-shaped arch assembly adjustably attached to the handle assembly;
   d. a pair of foot-and-wheel assemblies affixed to a bottom portion of the arch assembly, said foot and wheel assemblies further comprising:
      i. a leg affixed to the bottom portion of the arch assembly and having an affixed foot sleeve and a wheel, said foot sleeve being affixed at an oblique angle with the bottom portion of the arch assembly;
      ii. a foot slidably retained within the foot sleeve, said foot having an extended position and a stored position;
   and wherein the lifting device can be rolled over the tank with the feet in the stored position and then said feet inserted into the extended position for lifting the tank and said hook can be attached to the tank for transport.

2. The tank lifting device as recited in claim 1 wherein the arch assembly has an arch sleeve on a mid-portion of the arch assembly and wherein the handle assembly has a pin to retain the handle assembly within the arch sleeve on the arch assembly, and said handle assembly further has three pin apertures for three different tank lengths.

3. A device for lifting multiple sizes of tanks propane comprising:
   a. a handle assembly having a horizontally adjustable length to accommodate three different lengths of propane tanks;
   b. a horizontally adjustable assembly comprising a sleeve, chain and hook slidably attached to the handle assembly;
   c. a U-shaped arch assembly adjustably attached to the handle assembly;
   d. a pair of foot-and-wheel assemblies affixed to a bottom portion of the arch assembly, said foot and wheel assemblies further comprising:
      i. a leg affixed to the bottom portion of the arch assembly and having an affixed foot sleeve and a wheel, said foot sleeve being affixed at an oblique angle with the bottom portion of the arch assembly;
      ii. a foot slidably retained within the foot sleeve, said foot having an extended position and a stored position;
   and wherein the lifting device can be rolled over the tank with the feet in the stored position and then said feet inserted into the extended position for lifting the tank and said hook can be attached to the tank for transport.

4. The tank lifting device as recited in claim 3 wherein the arch assembly has an arch sleeve on a mid-portion of the arch assembly and wherein the handle assembly has a pin to retain the handle assembly within the arch sleeve on the arch assembly in one of three handle positions.

5. The tank lifting device as recited in claim 3 wherein the stored position is within a storage gusset at the bottom portion of the arch assembly.

6. The tank lifting device as recited in claim 3 wherein the feet are retained in the extended position by a nub on the bottom of the feet which engages the foot sleeve.

7. The tank lifting device as recited in claim 3 wherein the chain is inserted through a tank lug and then retained by a pair of chain lugs on an adjustable sleeve on the handle assembly.

* * * * *